United States Patent [19]
Poulson et al.

[11] Patent Number: 5,215,586
[45] Date of Patent: Jun. 1, 1993

[54] APPARATUS FOR COLLECTING AN OVERSPRAY

[75] Inventors: Tracy Poulson, Winchester; Lee Hirneisen, Cross Junction; Jeff Rezin, Stephens City, all of Va.

[73] Assignee: O'Sullivan Corporation, Winchester, Va.

[21] Appl. No.: 774,214

[22] Filed: Oct. 10, 1991

[51] Int. Cl.⁵ ............................................. B05B 1/28
[52] U.S. Cl. ............................... 118/326; 118/DIG. 7
[58] Field of Search .......... 118/323, 324, 326, DIG. 7

[56] References Cited

U.S. PATENT DOCUMENTS 5,036,792  8/1991  de Poly ............................. 118/326
5,040,482  8/1991  McGuire et al. ................... 118/326

*Primary Examiner*—W. Gary Jones
*Assistant Examiner*—Charles K. Friedman
*Attorney, Agent, or Firm*—Burns, Doane, Swecker & Mathis

[57] ABSTRACT

As a liquid is sprayed onto a sheet, some of the liquid is oversprayed beyond an edge of the sheet. A collector for collecting such overspray comprises a pan arranged below the edge of the sheet, and a vapor-retaining structure extending over the pan to define a plurality of narrow apertures which permit the overspray to pass into the pan, while resisting the passage of vapors upwardly through the apertures and back into the spray chamber. The vapor-retaining structure comprises a plurality of inverted V-shaped strips which are arranged parallel to one another such that the bottom edges of adjacent strips define the narrow apertures, the width of the apertures being in the range of about 1/32 to ¼ inch. This apparatus can be used as a hazardous waste minimization effort for spray coating operations.

14 Claims, 4 Drawing Sheets

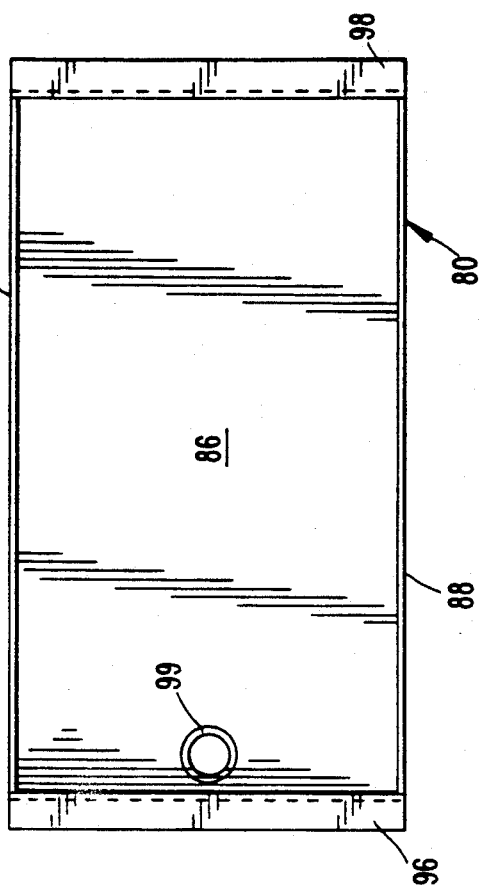
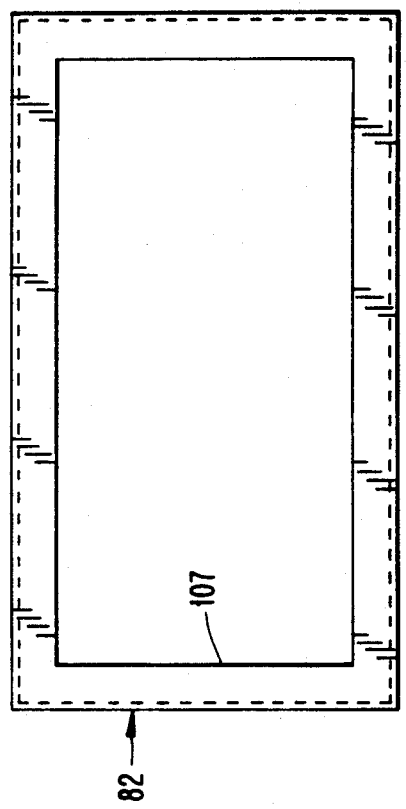
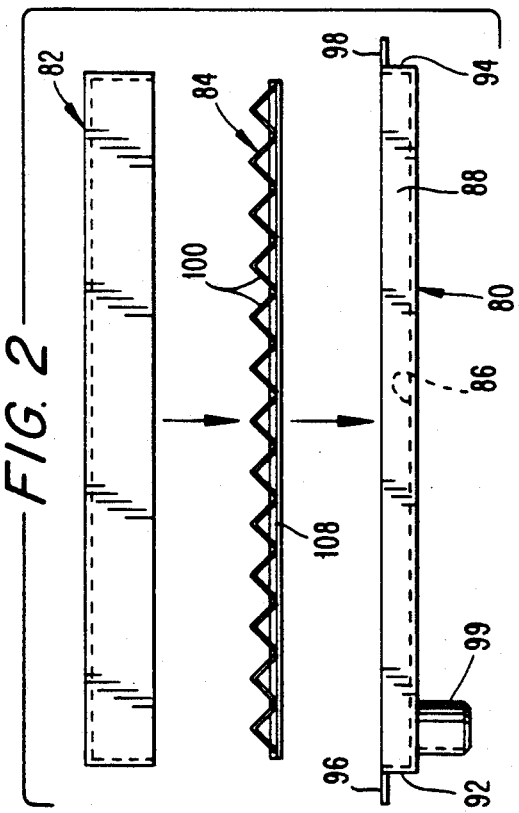
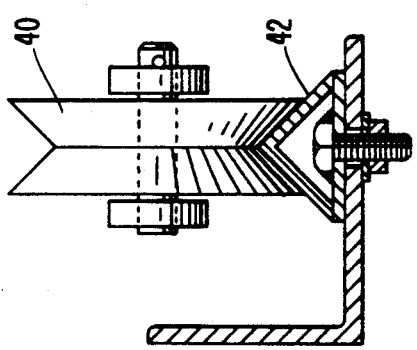

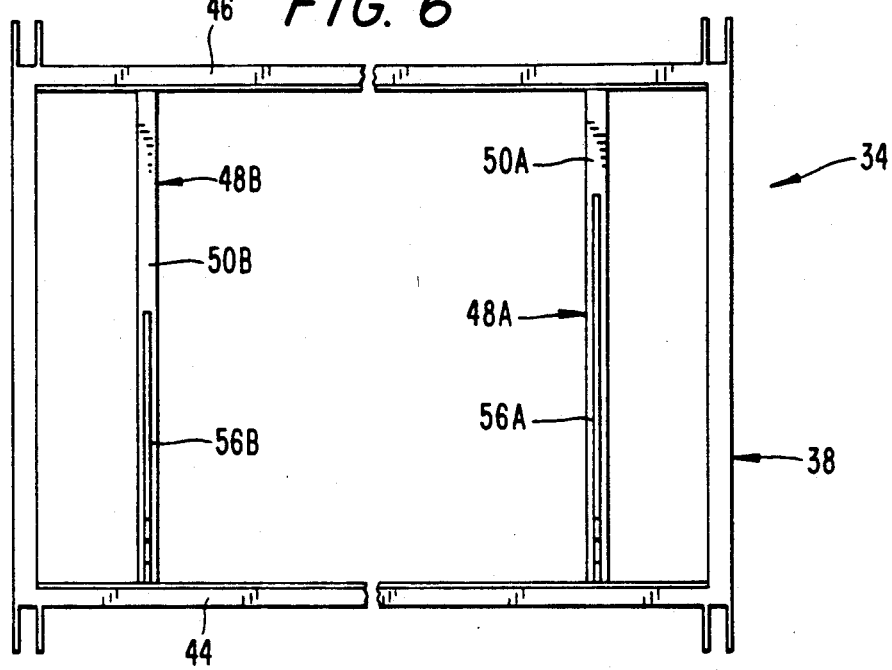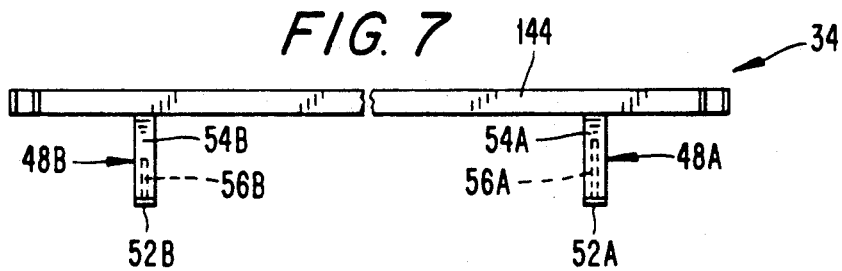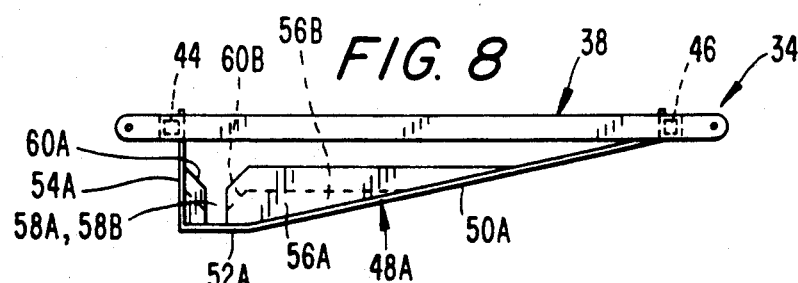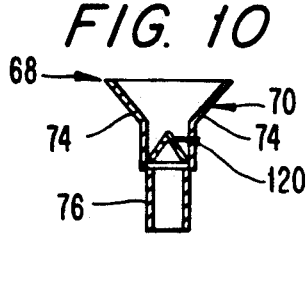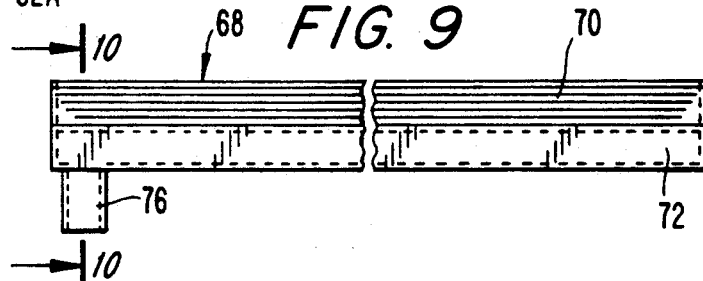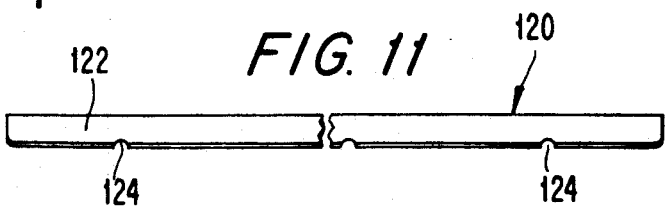

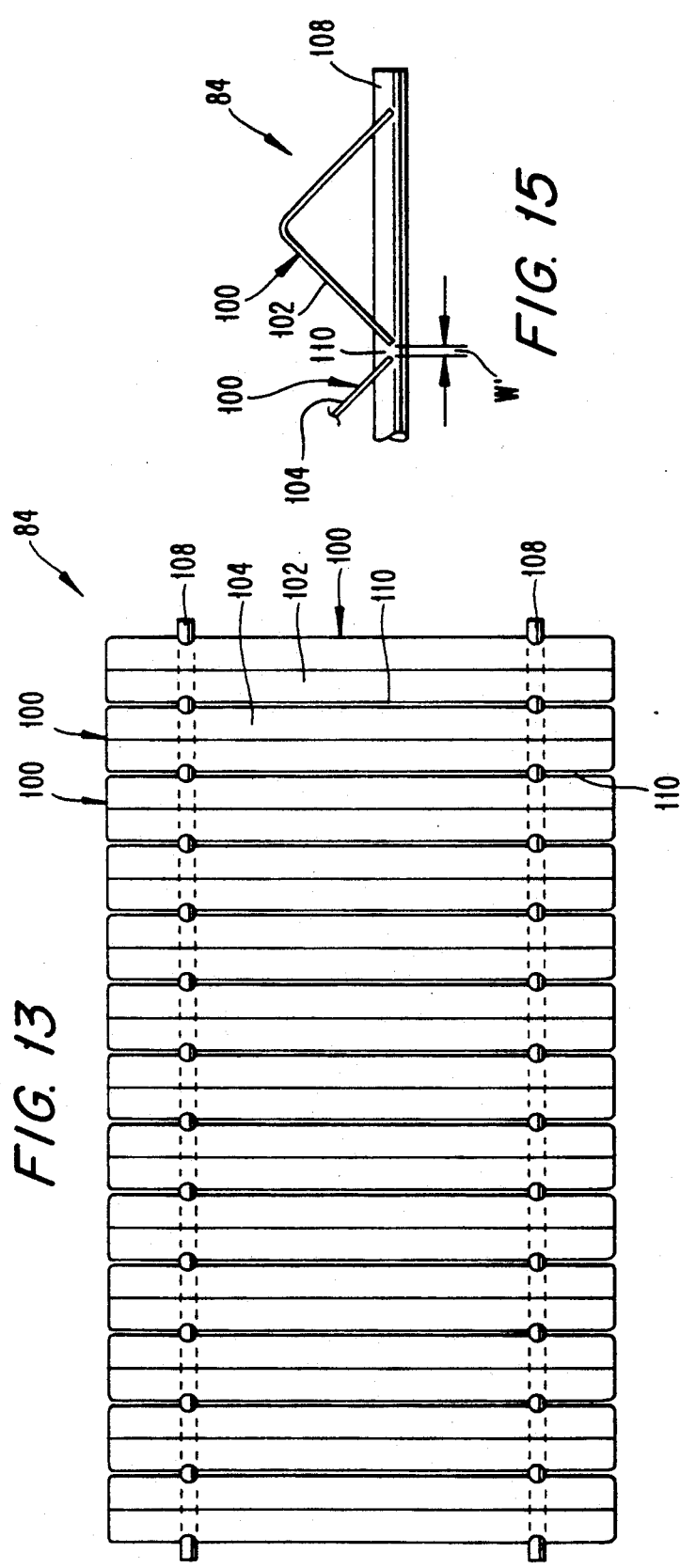
FIG. 13
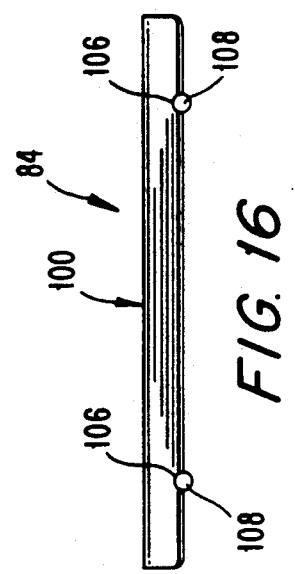
FIG. 15
FIG. 16
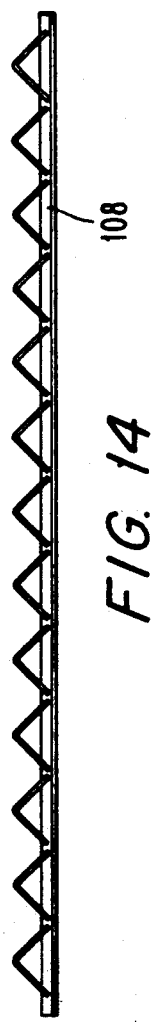
FIG. 14

APPARATUS FOR COLLECTING AN OVERSPRAY

BACKGROUND OF THE INVENTION

The invention relates to the spray coating of sheet material and, in particular, to the collection of an overspray occurring during such spray coating.

It is conventional to spray coat sheet material for various purposes, for example, it is common to spray paint a vinyl sheet material for us in the automotive industry. One known coating apparatus involves a spray booth through which the sheet travels in a horizontal direction. Disposed in the booth is a rotary sprayer which comprises a rotary nozzle carrier mounted for rotation about a vertical axis. A number of downwardly directed spray nozzles are mounted in a circular pattern on the support to spray the upper surface of the carrier as it rotates and the sheet passes therebeneath.

The circular pattern in which the nozzles are arranged has a diameter larger than the width of the sheet, so that the nozzles cyclically pass into and out of overlying relationship to the sheet. Since it is only necessary for each nozzle to spray during the period in which it overlies the sheet, the nozzles are activated as they sequentially reach one edge of the sheet and deactivated as they leave the opposite edge of the sheet. In order to ensure that both edge regions of the sheet are properly coated, it is desirable to regulate the ON-OFF cycle of each nozzle such that each nozzle oversprays at both of the edges of the sheet, i.e., such that a portion of the nozzle spray pattern extends outwardly past both respective edges of the sheet. The oversprayed coating material must be collected. Heretofore, for this purpose, collector sheets, also formed of vinyl, are placed beneath the edges of the sheet being spray coated. Those collector sheets collect the overspray. At the end of the spray operation, the collector sheets must be disposed of as hazardous waste.

Not only does the disposal of the collector sheets present a problem, due to the presence of the toxic coating material thereon, but difficulties have occurred during the spraying operation itself. In that regard, the spray material may contain solvents which evaporate within the booth. For example, a typical vinyl paint contains keystones (i.e., MEK MAK, MIBK) which vaporizes at 40° F. Such evaporation of solvent produces a vapor-rich environment within the booth which not only poses a hazard to operating personnel, but also may result in the recondensing of solvent onto the sheet, thereby diminishing the uniformity of the applied coating.

Therefore, it is customary to attempt to control the spraying as much as possible to reduce the amount of overspray. Notwithstanding those efforts, however, the above-described problems have persisted.

SUMMARY OF THE INVENTION

The present invention relates to an apparatus for spraying a sheet of material with a liquid substance by means of sprayers arranged to spray downwardly onto an upper surface of the sheet as relative movement is effected between the sheet and a carrier on which the sprayers are mounted. The sprayers are arranged to overspray at least one edge of the sheet. An overspray collecting apparatus is disposed beneath the edge of the sheet for collecting the overspray. The overspray collecting apparatus comprises at least one pan arranged below the sheet travel path along the edge of the sheet in order to receive the overspray. The pan includes a drain from which the collected overspray can be removed. A vapor-retaining structure extends over the pan and includes a plurality of narrow apertures through which the overspray passes.

Preferably, the vapor-retraining structure includes surfaces which form an angle relative to horizontal, with the narrow apertures being disposed between adjacent ones of the surfaces.

The surfaces may be formed by inverted V-shaped strips which are arranged in parallel and affixed together to be handled as a unit.

Preferably, a maximum dimension of the narrow apertures is in the range of about 1/32 to ¼ inches.

The overspray collecting structure preferably comprises front and rear collection units which are spaced apart along the edge of the sheet. A spacing between the front and rear collection units is adjustable in order to vary the locations where overspray is collected.

A vapor-retaining structure also preferably extends along and above a floor of the drain and includes a plurality of narrow apertures through which the overspray received through the pans may pass. The collected overspray is reusable as a raw material, thereby eliminating excessive waste.

BRIEF DESCRIPTION OF THE DRAWINGS

The objects and advantages of the invention will become apparent from the following description of a preferred embodiment thereof in connection with the accompanying drawings in which like numerals designate like elements, and in which:

FIG. 2 is an exploded side elevational view of a collection pan assembly according to the present invention;

FIG. 3 is a fragmentary front elevational view depicting a support wheel of the overspray collection apparatus mounted on a rail;

FIG. 4 is a top plan view of a pan component of the collection pan assembly;

FIG. 5 is a top plan view of a cover component of the collection pan assembly;

FIG. 6 is a top plan view of a carrier of a collection unit;

FIG. 7 is a front elevational view of the carrier depicted in FIG. 6;

FIG. 8 is a side elevational view of the carrier depicted in FIG. 6;

FIG. 9 is a side elevational view of a drainage duct according to the present invention;

FIG. 10 is a cross-sectional view taken along the line 10—10 in FIG. 9;

FIG. 11 is a side elevational view of a vapor-retaining diffuser member for use with the drainage duct depicted in FIG. 9;

FIG. 12 is an end elevational view of the diffuser member depicted in FIG. 11;

FIG. 13 is a top plan view of a vapor-retaining diffuser component of the collection pan assembly;

FIG. 14 is a side elevational view of the diffuser depicted in FIG. 13;

FIG. 15 is an enlarged fragmentary view of FIG. 14; and

FIG. 16 is a front elevational view of the diffuser depicted in FIG. 13.

DETAILED DESCRIPTION OF A PREFERRED EMBODIMENT OF THE INVENTION

Figure 1:
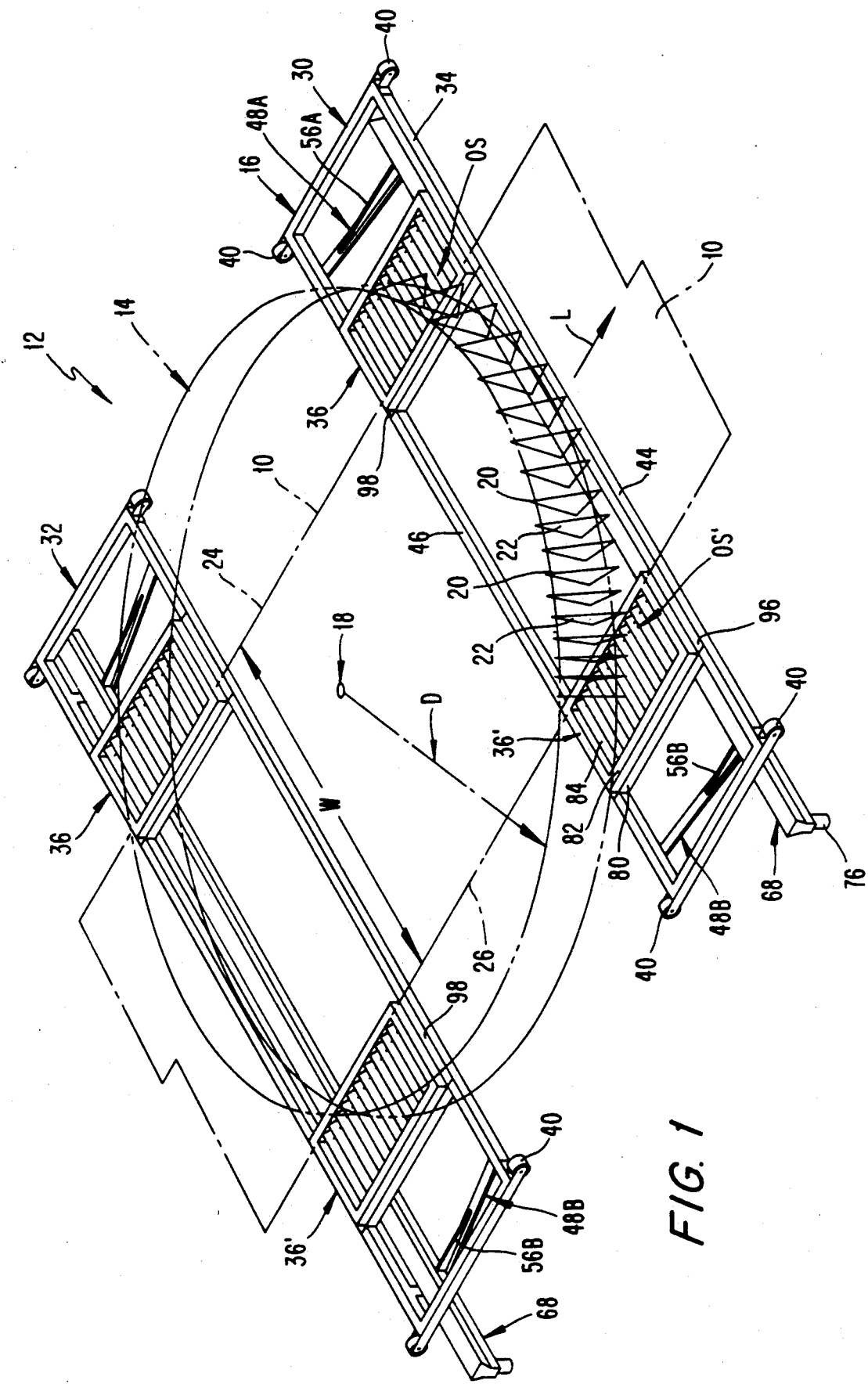
FIG. 1 is a top perspective view of an overspray collecting apparatus according to the present invention, wherein a sprayer unit and a sheet being coated are shown in phantom lines.

Depicted in FIG. 1 is a horizontal sheet 10 of material (shown in phantom) such as vinyl which is passing in a longitudinal direction L through a spray-painting station 12. The spray painting station 12 includes an overhead spraying mechanism 14 (shown in phantom) and an overspray collection apparatus 16 according to the invention.

The sheet 10 of material can be of finite length, or an infinite-length web of material. Any type of sheet material which is to be spray-coated can be passed through the station 12.

The spraying mechanism 14 can be of any suitable type such as a conventional horizontally reciprocating sprayer or a conventional rotary sprayer. In the latter, a nozzle carrier (not shown) rotates about a vertical axis 18. A plurality of downwardly directed spray nozzles (not shown) are mounted on the carrier at spaced locations 20, the locations being arranged in a circular pattern about the axis 18. The nozzles emit downwardly directed sprays 22 of coating liquid which coat the passing sheet 10.

The circular pattern in which the nozzle locations 20 are arranged has a diameter D which is larger than a width W of the sheet. Hence, each nozzle cyclically passes into and out of overlying relationship with the sheet. Since it is only necessary for each nozzle to spray during the period in which it overlies the sheet, the nozzles are sequentially activated as they reach one edge of the sheet (i.e., the edge 24 in FIG. 1), and deactivated as they leave the opposite edge 26. Each nozzle is activated twice per revolution, since it passes over the sheet twice during each revolution.

In order to ensure that both edge regions of the sheet are properly coated, it is desirable to regulate the ON-OFF cycle of each nozzle such that each nozzle oversprays at both edges 24, 26 of the sheet, as depicted in FIG. 1. That is, a portion of the nozzle spray pattern extends outward past a respective edge 24, 26 to form overspray areas OS, OS'.

In accordance with the present invention, the overspray is collected by the collection apparatus 16 in a manner which inhibits the ability of solvents in the collected liquid to vaporize. By inhibiting such vaporization, the solvent vapor concentration in the atmosphere of the painting station is reduced, thereby diminishing the health hazards and the ability for the vapor to recondense on the sheet.

The collected coating overspray, because of the confines of the collection system, is able to be reused on the line with minimal preparations or formulation adjustments. Raw material consumption is therefore significantly effected by this design.

The collection apparatus 16 comprises front and rear collection units 30, 32 which are spaced apart in the direction of sheet travel L. Those units 30, 32 are essentially identical, so only the front unit 30 will be described in detail.

The collection unit 30 basically comprises a carrier 34, a pair of collection pan assemblies 36, 36' mounted on the carrier 34, and a drainage duct 36 mounted on the carrier 34 below the collection pan assemblies 36, 36'.

The carrier 34, depicted also in FIGS. 6-8, comprises a rectangular framework 38 to the four corners of which are mounted wheels 40. The wheels enable the carrier 34 to be displaced along fixed rails 42 (see one rail depicted in FIG. 3) to various positions of adjustment. Extending between front and rear legs 44, 46 of the carrier 34 are two support arms 48, 50. The arms 48A, 48B include inclined portions 50A, 50B which extend forwardly and downwardly from the rear leg 46, a horizontal portion 52A, 52B extending forwardly from the front end of the inclined portion, and an upright portion 54A, 54B extending upwardly from the front end of the horizontal portion and attached to the front leg 44.

A vertical plate 56A, 56B is mounted on each of the support arms 48A, 48B. Each of the plates includes an upwardly open recess 58A, 58B, the recesses being chamfered at 60A, 60B at their upper ends. One of the recesses 58B is of shorter height than the other recess 58A, as can be seen in FIG. 8.

The support arms 48A, 48B function to carry a drainage duct 68 which is depicted in FIGS. 9-12. That duct 68 comprises an upper funnel portion 70, and a rectangular receiver portion 72 depending downwardly from the funnel portion 70. The receiver portion 72 is sized to be lowered into the recesses 58A, 58B of the support arms 48A, 48B such that the lower faces 74 of the funnel portion rest upon the chamfers 60A, 60B of those recesses. Since the recesses are of different heights, the duct will be canted toward one side of the collection unit 30 (i.e., to the left in FIG. 1). An outlet 76 is provided at the lower end of the duct 68 to discharge collected overspray, as will be explained later.

The two collection pan assemblies 36, 36' are identical and thus only one will be described in detail in connection with FIGS. 2, 4, 5 and 13-16. The collection pan assembly 36 comprises a pan 80, a cover 82, and a vapor-retaining diffuser member 84 disposed between the pan and cover, as depicted in FIG. 2. The pan 80 is of rectangular shape (see FIG. 4) and includes a floor 86, two upright side walls 88, 90, and upstanding front and rear walls 92, 94. Projecting outwardly from upper ends of the front and rear walls 92, 94 are ledges 96, 98 which rest upon, and are fixed to, the front and rear legs 44, 46, respectively, of the carrier 34. The floor 86 is canted toward a drain opening 99.

The vapor-retaining diffuser member 84 comprises a plurality of strips 100 of metal which are arranged in parallel. Each strip 100 is of inverted V-shape in profile (see FIGS. 14, 15) and include two downwardly diverging legs 102, 104. Each of the legs 102, 104 includes two semi-circular recesses 106 (see FIG. 16), and the recesses of all of the strips are aligned to receive two cylindrical bars 108. The strips are fixed to the bars, e.g., by welding, so that the strips and bars can be handled as an integral unit.

The lower ends of the legs 102, 104 of adjacent strips 100 are spaced apart to form a plurality of apertures 110 between the strips. The apertures are in the form of elongated slits and are very narrow, i.e., each slit preferably has a maximum width W' in the range of 1/32 to ¼ inches. The actual width is governed primarily by the viscosity of the liquid being sprayed to enable the liquid to flow downwardly through the apertures.

The vapor-retaining diffuser member is laid upon the floor 86 of the pan 80, and the cover 84 is placed onto the pan 80 and affixed thereto, e.g., by welding. An opening 107 (FIG. 5) in the top of the cover enables overspray to pass therethrough.

It will be appreciated that since the bars 108 project downwardly past the lower ends of the strips 100, those lower ends will be raised off the floor 86 of the pan 80 and will enable overspray to pass downwardly therethrough and into the pan. Thus, the overspray gravitates along the upper surfaces of the legs 102, 104 of the strips and passes into the pan 80 through the apertures 110. Once the overspray reaches the pan 80, any vaporization of the solvent will not result in appreciable amounts of vapor returning to the spray station atmosphere, due to the narrowness of the apertures 110. Hence, there will occur less polluting of that atmosphere and less chance for vapor to recondense onto the sheet. Rather, the vapor will recondense on the lower surfaces of the strips 100 and eventually pass through the drain 99. The drain 99 is positioned over the duct 68, so that the collected overspray will pass into that duct and be conducted to the outlet 76.

Positioned along the drain is an additional vapor retaining diffuser member 120 (see FIGS. 10–12). That member comprises an inverted V-shaped strip which extends along the entire length of the duct 70. Lower edges of the legs 122 of the member 120 include narrow apertures in the form of spaced recesses 124 which permit the collected overspray to be pass through to a floor of the duct 70 and gravitate to the outlet 76.

In the event that a different sheet of less width is subsequently passed through the spray station 12, the timing of the ON-OFF cycle of the nozzles is changed accordingly. That means that the location where the overspray occurs will be shifted along the direction L. That shifting can be compensated for by manually displacing the collection units 30, 32 along the tracks 42 to underlie the new overspray locations. In so doing, the front and rear collection units 30, 32 will be displaced in mutually opposite directions.

In practice, the sheet 10 is advanced through the spray station 12, with the edges 24, 26 of the sheet disposed spaced above the pans 36, 36' of the front and rear collection units 30, 32. The sprayer unit 14 rotates about the stationary vertical axis 18, and the spray nozzles are activated during the period in which the nozzles overlie the sheet (i.e., each nozzle will be activated twice during each rotation). The nozzles are activated in such manner that an overspray occurs at each sheet edge 24, 26, the overspray falling into the pan assemblies 36, 36' in the front and rear collection units 30, 32. The overspray falls upon the diffuser strips 100 and gravitates along the legs 102, 104 thereof and passes through the narrow apertures 110. Overspray is thus collected within the pans 80 and gravitates to the drains 99. The collected overspray passes through the drains 99 and enters the ducts 70, where it gravitates along the legs 122 of the diffuser strips 120 of each duct and through the apertures 124 thereof. From there, the overspray travels along the floors of the ducts to the outlets 76 where it enters a suitable conduit or container for subsequent reuse and/or disposal.

Due to the presence of the narrow apertures 110 in the diffuser member 84, and the narrow apertures 124 in the diffusers 120, most of the solvent vapor which is formed within the pans 80 or ducts 70 will be able to return to the atmosphere of the spray station. Hence, that atmosphere will be less polluted, and there is less chance for recondensation of vapor onto the sheet. Also, the recovery of the vapor with the overspray via the collection unit means that a greater amount of overspray will be recovered for reuse.

If sheets of different width size are passed through the spray station 12 (thereby relocating the overspray locations), the front and rear collection units can be adjustably displaced relative to one another (i.e., in mutually opposite directions), so that the pan assemblies 36, 36' underlie the overspray locations.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. In an apparatus for spraying a sheet of material with a liquid substance by means of sprayers arranged to spray downwardly onto an upper surface of the sheet as relative movement is effected between the sheet and a carrier on which the sprayers are mounted, said sprayers arranged to overspray at least one edge of the sheet, and overspray collecting means disposed beneath said at least one sheet edge for collecting the overspray, said overspray collecting means comprises at least one pan arranged below the sheet travel path along said one edge to receive the overspray, said pan including a drain from which the collected overspray can be removed, and vapor-retaining means extending over said pan, said vapor-retaining means including a plurality of narrow apertures through which the overspray passes into said pan, a maximum width of said narrow apertures being in a range of about 1/32 to about ¼ inches.

2. Apparatus according to claim 1, wherein said vapor-retaining means includes surfaces forming an angle relative to horizontal, said narrow apertures being disposed between adjacent ones of said surfaces.

3. Apparatus according to claim 2, wherein said surfaces also form an angle relative to vertical, said narrow apertures disposed at lower ends of said surfaces.

4. Apparatus according to claim 1, wherein said vapor-retaining means comprises a plurality of inverted V-shaped parallel strips, said narrow apertures disposed at lower edges of said strips.

5. Apparatus according to claim 4 including at least two bars extending laterally of said strips and fixed thereto to retain said strips together, said bars projecting downwardly beyond lower edges of said strips.

6. Apparatus according to claim 1, wherein said vapor-retaining means comprises parallel strips each including angularly oriented legs, said legs joined at their upper ends and diverging downwardly, adjacent strips having their legs spaced apart adjacent a lower end thereof to define said narrow apertures.

7. Apparatus according to claim 1, wherein said overspray collecting means comprises front and rear collection units spaced apart along the edge of the sheet, each of said collection units including said pan; a spacing between said front and rear collection units being adjustable to vary the locations where overspray is collected.

8. Apparatus according to claim 7, wherein the sprayers move in a circular pattern about an upright axis, a diameter of said circular pattern being greater than an edge-to-edge width of the sheet.

9. Apparatus according to claim 7, wherein each of said collection units includes two of said pans which are disposed below opposite edges of the sheet.

10. Apparatus according to claim 9, wherein each pan includes an inclined floor and a drain opening adjacent a lower end of said floor.

11. Apparatus according to claim 10, wherein each collection unit includes a duct extending between said drain openings of its respective pans, said duct being inclined and including an outlet adjacent an end thereof, and a vapor-retaining member extending along and above a floor of said drain and including a plurality of narrow apertures through which passes the collected overspray received from said pans.

12. Apparatus according to claim 11, wherein said vapor-retaining member in said duct comprises an inverted V-shaped strip with narrow recesses formed along lower edges thereof to define said narrow apertures therein.

13. In an apparatus for spraying a sheet of material with a liquid substance by means of sprayers arranged to spray downwardly onto an upper surface of the sheet as relative movement is effected between the sheet and a carrier on which the sprayers are mounted, said sprayers arranged to overspray at least one edge of the sheet, and overspray collecting means disposed beneath said at least one sheet edge for collecting the overspray, said overspray collecting means comprises at least one pan arranged below the sheet travel path along said one edge to receive the overspray, said pan including a drain from which the collected overspray can be removed, and vapor-retaining means extending over said pan, said vapor-retaining means including a plurality of narrow apertures through which the overspray passes into said pan, said vapor-retaining means comprising a plurality of inverted generally V-shaped parallel strips, said narrow apertures disposed at lower edges of said strips, and at least two bars extending laterally of said strips and fixed thereto to retain said strips together, said bars projecting downwardly beyond lower edges of said strips to space said apertures above a floor of said pan.

14. In an apparatus for spraying a sheet of material with a liquid substance by means of sprayers arranged to spray downwardly onto an upper surface of the sheet as relative movement is effected between the sheet and a carrier on which the sprayers are mounted, said sprayers arranged to overspray two edges of the sheet, and overspray collecting means disposed beneath said edges for collecting the overspray, said overspray collecting means comprises two pans arranged below the sheet travel path along respective ones of said edges to receive the overspray, each pan including an inclined floor and a drain at a lower end of said floor from which the collected overspray can be removed, vapor-retaining means extending over each pan, said vapor-retaining means including a plurality of narrow apertures through which the overspray passes into said pan, and a duct extending beneath said drain openings of both of said pans, said duct being inclined and including an outlet adjacent an end thereof, and a vapor-retaining member extending along and above a floor of said duct and including a plurality of narrow apertures through which passes the collected overspray received from said pans.

* * * * *

UNITED STATES PATENT AND TRADEMARK OFFICE
CERTIFICATE OF CORRECTION

PATENT NO. : 5,215,586
DATED : June 1, 1993
INVENTOR(S) : Tracy Poulson; Lee Hirneisen, Jeff Rezin It is certified that error appears in the above-indentified patent and that said Letters Patent is hereby corrected as shown below:

Column 1, line 45, change "keystones"
-- keytones --

Column 1, line 46, change "40°"
to -- 6° --

Signed and Sealed this

Thirteenth Day of December, 1994

Attest:

BRUCE LEHMAN

*Attesting Officer*         *Commissioner of Patents and Trademarks*